(12) United States Patent
Pirri et al.

(10) Patent No.: US 9,352,515 B2
(45) Date of Patent: May 31, 2016

(54) METHOD TO MAKE ARMS IN A COMPOSITE MATERIAL FOR THE DISTRIBUTION OF CONCRETE AND ARM THUS OBTAINED

(75) Inventors: Nicola Pirri, Milan (IT); Paolo Dario Maini, Monza (IT)

(73) Assignee: CIFA SPA, Senago (IT)

( * ) Notice: Subject to any disclaimer, the term of this patent is extended or adjusted under 35 U.S.C. 154(b) by 57 days.

(21) Appl. No.: 14/000,528

(22) PCT Filed: Feb. 22, 2012

(86) PCT No.: PCT/IB2012/000313
§ 371 (c)(1),
(2), (4) Date: Aug. 20, 2013

(87) PCT Pub. No.: WO2012/114190
PCT Pub. Date: Aug. 30, 2012

(65) Prior Publication Data
US 2013/0333829 A1   Dec. 19, 2013

(30) Foreign Application Priority Data
Feb. 23, 2011   (IT) .............................. MI2011A0273

(51) Int. Cl.
*B29C 53/58* (2006.01)
*B29C 70/32* (2006.01)
(Continued)

(52) U.S. Cl.
CPC ................ *B29C 70/021* (2013.01); *B05B 1/02* (2013.01); *B29C 53/584* (2013.01);
(Continued)

(58) Field of Classification Search
CPC .. B29C 53/583; B29C 53/584; B29C 53/587; B29C 70/32; B66C 23/64; B66C 23/68; B66C 23/70; B66C 23/701; E04C 3/29; E04G 21/0445; F16L 3/015
USPC ..................................................... 156/173, 189
See application file for complete search history.

(56) References Cited

U.S. PATENT DOCUMENTS

| | | |
|---|---|---|
| 3,604,465 A | 9/1971 | Schetty |
| 4,769,967 A * | 9/1988 | Bourrieres .............. E04H 12/02 174/45 R |

(Continued)

FOREIGN PATENT DOCUMENTS

| | | |
|---|---|---|
| DE | 1090148 | 9/1960 |
| EP | 2039498 | 3/2009 |
| EP | 1970344 | 8/2010 |

OTHER PUBLICATIONS

International Search Report and Written Opinion of PCT/IB2012/000313 dated Jun. 13, 2012.

*Primary Examiner* — Michael Tolin
(74) *Attorney, Agent, or Firm* — Rankin, Hill & Clark LLP

(57) ABSTRACT

Method to make an arm in a composite material for articulated or telescopic modular structures for the distribution of concrete, which comprises a first step in which one or more layers of fiber (16, 25) are distributed on the external surface (17) of a male-type mold (11) having a cross section defined by at least a substantially flat wall. The section of the male mold (11) reduces, in at least one of its sizes, passing from one of its ends to the other. The fibers (16) may or may not be pre-impregnated with a resinous matrix. The method also comprises a second step in which the male mold (11) is ejected from the product thus obtained, a possible heat treatment being provided, for example in autoclave, before the extraction of the product.

10 Claims, 4 Drawing Sheets

(51) Int. Cl.
*E04C 3/29* (2006.01)
*E04G 21/04* (2006.01)
*B66C 23/70* (2006.01)
*B29C 70/02* (2006.01)
*B66C 23/64* (2006.01)
*B05B 1/02* (2006.01)

(52) U.S. Cl.
CPC .............. *B29C 53/587* (2013.01); *B29C 70/32* (2013.01); *B66C 23/64* (2013.01); *B66C 23/70* (2013.01); *E04C 3/29* (2013.01); *E04G 21/0445* (2013.01)

(56) References Cited

U.S. PATENT DOCUMENTS

| | | | |
|---|---|---|---|
| 5,492,579 A * | 2/1996 | Hosford et al. | 156/64 |
| 6,403,179 B1 | 6/2002 | Adachi | |
| 6,453,635 B1 * | 9/2002 | Turner | 52/848 |
| 6,786,233 B1 * | 9/2004 | Anderson et al. | 137/615 |
| 2002/0071920 A1 * | 6/2002 | Obeshaw | 428/34.1 |
| 2006/0257604 A1 | 11/2006 | Anderson et al. | |
| 2010/0282701 A1 * | 11/2010 | Cortellini et al. | 212/300 |

\* cited by examiner

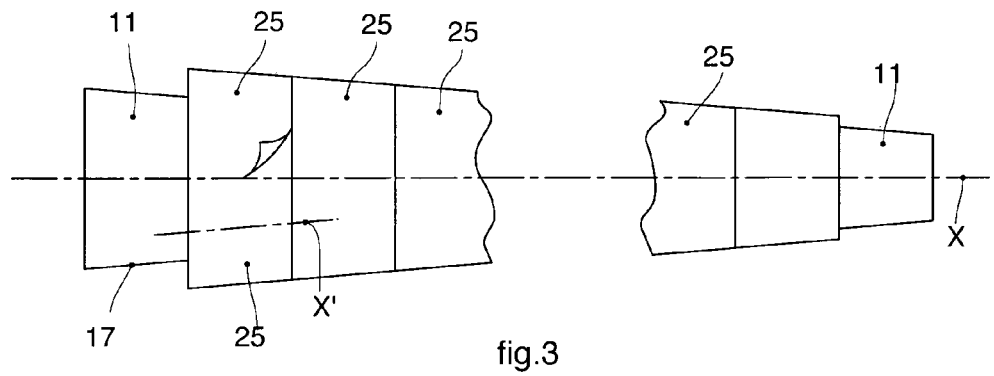
fig.3
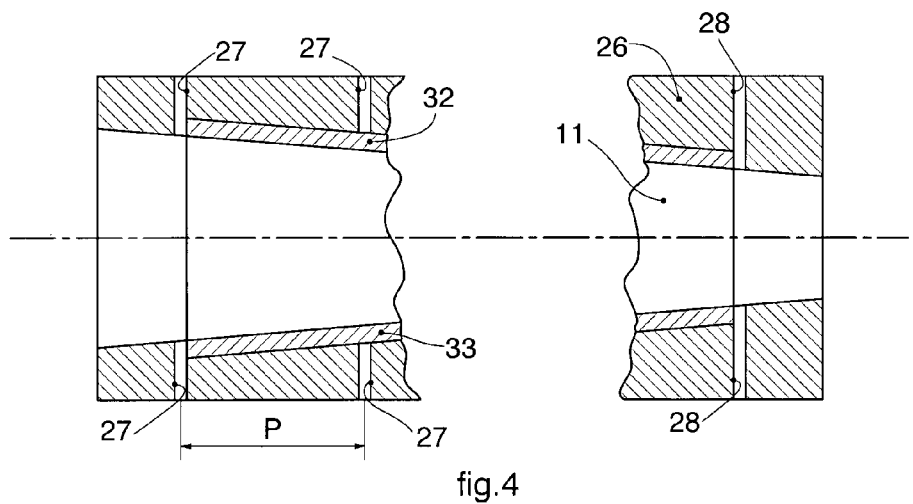
fig.4
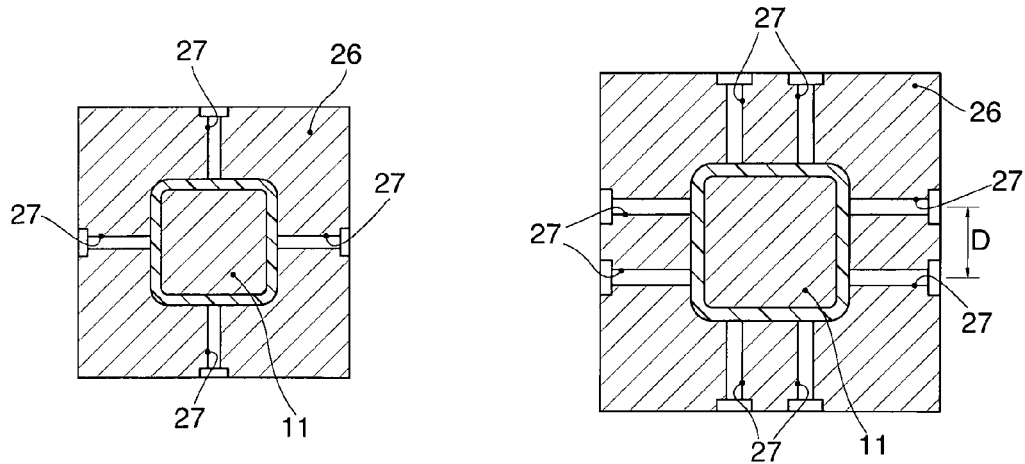
fig.4a
fig.4b ns attached. The composite material is deposited on the exterior surface of the male mold.

METHOD TO MAKE ARMS IN A COMPOSITE MATERIAL FOR THE DISTRIBUTION OF CONCRETE AND ARM THUS OBTAINED

FIELD OF THE INVENTION

The present invention concerns a method to make arms in a composite material used for the distribution of concrete or other material similar to concrete, and mounted on heavy work vehicles, such as a truck, a concrete mixer or a crane.

In particular, the present invention concerns a method to make arms in a composite material able to be joined to each other at the ends to form an articulated or telescopic modular structure, which can assume a plurality of positions between a folded position of minimum bulk and a position of maximum extension.

The invention also concerns the arm in a composite material achieved with the method.

BACKGROUND OF THE INVENTION

Tubular arms in a composite material are known, used to make articulated or telescopic structures, which are moveable and used to support and guide transport means for materials, such as for example pipes to carry concrete or materials similar to concrete.

An example of such arms is described in the European patent EP-B-1.970.344, in the name of the Applicant, which describes arms in composite material pivoted to each other at the ends to form an articulated and mobile structure for heavy vehicles.

The arms in question generally have a substantially square or generically polygonal, circular or elliptical section, which reduces at least according to a characteristic size passing from one end to the other, and a development in length much greater than that of the other sizes.

Said arms can be provided of stiffening and strengthening elements, of connecting elements for the connection to other arms o to moving means, or again of specific equipment based on the several use of the arms. From EP-A-2.039.498, also in the name of the Applicant, a method to make such arms in composite material is known, which provides a first step in which a suitable quantity of layers of fiber is deposited inside the volume of suitable female molds; the fiber may already be pre-impregnated or impregnated in a subsequent step. The method also comprises a second step in which the composite material is subjected to a heat process, typically in autoclave, and a final step in which the necessary mechanical finishing works are carried out.

One disadvantage of this known method is that the operations to be carried out cannot be done in a completely automated way. Consequently the productivity remains limited, the differences between one embodiment and another of a same model of arm can be considerable and the labor costs cannot be optimized.

A further disadvantage of the known method is that it is difficult for the operating machines to access some areas of the mold, which further complicates the possibility of making the process automated. Moreover, in the case of arms with hollow section, it may be necessary to provide two female molds to make two parts, symmetrical according to a plane passing through the longitudinal axis of the arm, which must then be joined.

One purpose of the present invention is to improve the productive process of the arms in composite material described above, in order to render the process more suitable for automation and therefore guarantee greater productivity.

Another purpose of the present invention is to make a repeatable and producible product with uniform features and with reduced costs and times.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a method to make an arm in composite material for articulated or telescopic modular structures according to the present invention comprises a first step in which one or more layers of fiber are distributed, together with or without the resinous matrix (that is, pre-impregnated or dry fibers), on the external surface of a male-type mold having a cross section defined by at least one, preferably two, substantially flat walls, in which the section of the male mold reduces, possibly with constant intermediate segments, in at least one of its sizes passing from one of its ends to the other.

In one solution of the invention, the section is polygonal, advantageously rectangular or square, in which all the faces of which it consists are substantially flat.

In a preferential form of embodiment, the polygonal section is characterized by having its edges rounded or radiated.

In this case, the reduction in the cross section can occur on both sizes in width of the rectangular or square sections.

In the case of a square section, it can be square in correspondence to one end in order to transform into a rectangular section in correspondence to the other end.

Vice versa, a rectangular section at one end can transform into a square section in correspondence to the other end.

In another variant form, the section can be rectangular both at the front end and at the back end, with a reduction in section area between the two ends.

The depositing technique is chosen from one or another of the substantially known techniques, such as RTM (Resin Transfer Molding), the Infusion technique, the Pultrusion technique, the Filament Winding technique etc.

The use of a mold of the male type allows an easier depositing of the material by the machines used for this purpose, above all when the shape to be made has geometrically complicated zones characterized by small sizes.

Moreover the mold can be removed simply by ejecting it from the composite material deposited above it, once the consolidating heat treatment step is complete.

If provided, the heat treatment can be carried out for example in autoclave or with another known method. It is also provided that the heat treatment is not necessary, or is carried out in other ways.

Possible mechanical works to eliminate any excess material and to make the association seatings for the auxiliary components of the arm, such as bushings, eyelets and reinforcement or connection plates to other arms can also be provided after the extraction of the male mold from the product.

The arm in composite material thus obtained consists of a hollow beam, with preferentially square section, or generically polygonal or another shape, with at least one flat face, advantageously two, for the attachment of movement or reinforcement equipment or accessories, with a development in length much greater than the characteristic sizes of the section.

The cross section of the arm progressively reduces, in a continuous manner or continuous in segments, according at least to one of its sizes, from one end of the arm to the other.

One advantage which characterizes this reduction in section is that the geometry of the section grows as the bending moment on the arm increases, and therefore increases its efficiency. This means that, given the same load, the reducing section will consist of a fewer number of layers of carbon compared with the case of a section with a constant geometry.

Unlike in known solutions, where in other fields molding techniques are used with male molds similar to the technique used here, one form of embodiment of the invention provides that the reduction in the size of the section of the arm along the longitudinal extension is not limited only to the draft angle of the arm by the male mold. Indeed the present invention provides to correlate the reduction of the section sizes along the longitudinal extension to the mechanical stresses for which it has been sized and for which it must resist during use. To this purpose the passage from the zone of the articulated arm with a smaller section to that with a bigger section occurs with an angle of inclination of more than 5°, preferably between 5° and 20°, even more preferably between 10° and 15°, and therefore with amplitudes of the angle much greater than the draft amplitudes provided in the state of the art used in other fields, which are normally comprised between 2° and 5°.

Similarly, the invention provides that the male mold used, on which the fibers are deposited, is made especially to have an external surface shaped with the same shape, in negative, as indicated above for the geometry of the arm.

Since in the application of the present invention, the bending moment can double between the beginning and the end of a segment of arm, the ratio between the final section of the arm and the initial one, where S is the initial section and s is the final section, can be defined by the formula $s=0.4$-$0.6$ $S$, thus guaranteeing a resistance to stresses which varies depending on the loads applied on the length of the arm.

In other forms of embodiment, it is provided that, during the first step, the depositing of the fibers occurs with a greater distribution in correspondence to the section with smaller sizes, to progressively reduce in correspondence to the section with bigger sizes. This particular distribution of the fibers allows to optimize the resistance of the arm depending on the particular stresses which it is subjected to during use.

In other forms of embodiment, again in order to optimize the resistance of the arm during use, it can be provided that the zone of the arm with the section having smaller sizes has a greater thickness compared to the zone of the arm with sections of greater sizes.

In other forms of embodiment it can be provided that the thickness of the section with smaller sizes is double that with bigger sizes.

Another advantage which characterizes this type of section is the reduction of the irregularity in rolling which would occur if the section were made as a constant section.

Another advantage deriving from the use of a tapered section is connected to the reduction in the bulk required, since an arm made in this way is smaller and occupies less space compared to one with a constant section and this allows to make the overall layout of the machine easier.

BRIEF DESCRIPTION OF THE DRAWINGS

These and other characteristics of the present invention will become apparent from the following description of a preferential form of embodiment, given as a non-restrictive example with reference to the attached drawings wherein:

FIG. 3 schematically represents the first step of a second form of embodiment of a method to make an arm in a composite material according to the present invention;.

FIG. 4 schematically represents the second step of the method in FIG. 4;

FIG. 4a is a schematic representation of a cross section of FIG. 4;

FIG. 4b is a schematic representation of a variant of FIG. 4;

Figure 1:
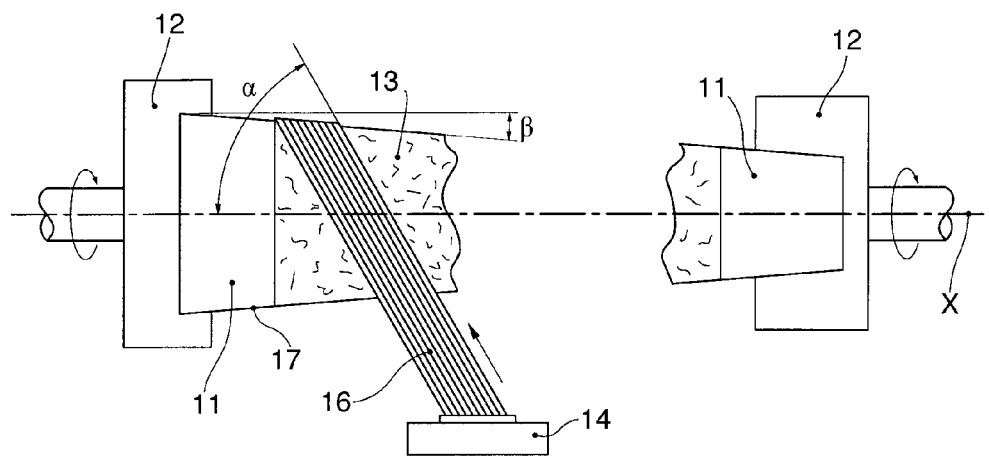
FIG. 1 schematically represents a step of a first form of embodiment of a method to make an arm in a composite material according to the present invention.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF SOME PREFERENTIAL FORMS OF EMBODIMENT

With reference to FIG. 1 according to a first form of embodiment of the invention, a method to make arms in composite material, indicated generically by the reference number 10, comprises a first step in which a male mold 11, or core, is mounted on a mandrel 12 (FIG. 1).

The male mold 11 has a section shape with at least one face, advantageously two, or all, substantially flat, so that the arm 10 has corresponding flat faces which allow plates, flanges or similar to be attached on them, in order to anchor functional elements or accessories to the arm 10, such as movement jacks, anchoring elements to adjacent arms or other.

The section of the male mold 11 reduces longitudinally, from one end to the other, in a substantially continuous way, or it can have segments with a constant section, which connect together two sections which reduce.

Figure 2:
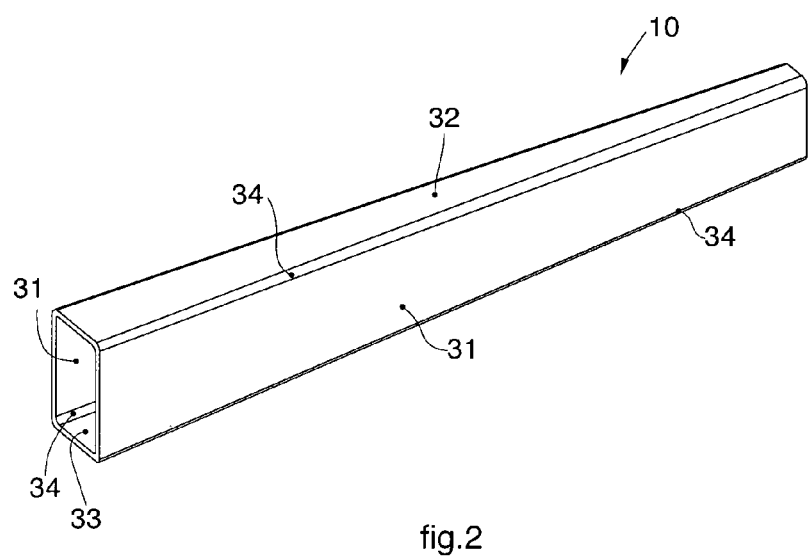
FIG. 2 is a perspective view of one form of embodiment of an arm in composite material obtained according to the present invention.
Figure 2A:
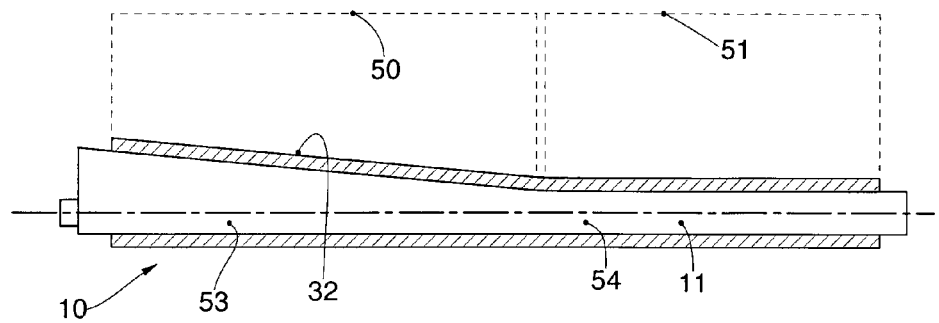
FIG. 2a is a section view of a first form of embodiment of the arm obtained with the present invention.

For example, with reference to FIG. 2a, the arm 10 comprises a first segment 50, or tapered segment, which has one of its upper walls 32 having a determined conicity, and a second segment 51 having a constant section along its longitudinal section.

In another form of embodiment (FIG. 2b), the upper wall 32 and the lower wall 33 of the first segment 50 narrow with respect to each other with a determinate conicity in order to subsequently connect to the second segment 51.

In another form of embodiment (FIG. 2c), the second segment 51 of the arm 10, or at least one of either the upper wall 32 or the lower wall 33, instead of a rectilinear development has a development with parabolic profile. Again with reference to FIG. 2c, it is advantageous to provide that the first segment 50, with a conical development, extends for about 20% of the overall length of the arm 10, while the second segment 51 extends for the remaining part. Moreover, it is advantageous to provide that, passing from the end of the first segment 50 to the end of the second segment 51, there is a halving of the sizes of the section.

Figure 2B:
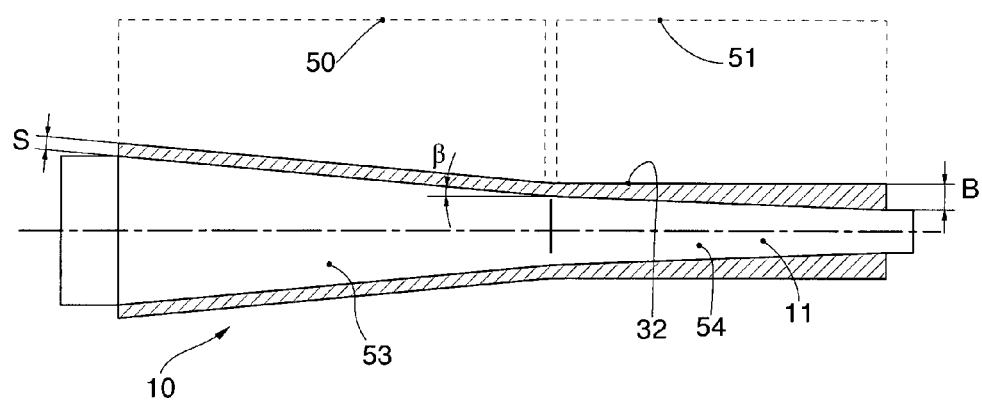
FIG. 2b is a section view of a second form of embodiment of the arm obtained with the present invention.
Figure 2C:
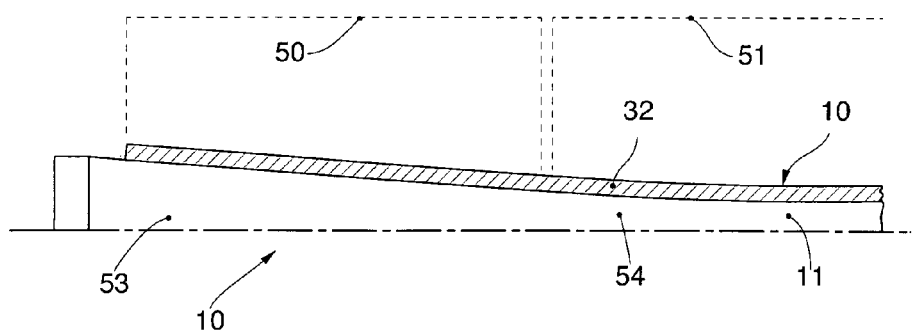
FIG. 2c is a section view of a third form of embodiment of the arm obtained with the present invention.

The mold 11 which is used to make the arms 10 as shown in FIGS. 2a, 2b, and 2c has longitudinal portions, respectively a first portion 53, and a second portion 54, shaped with the same shape in negative of the internal surface of the arm 10, or respectively of the first segment 50 and of the second segment 51.

Specifically, the mold 11 therefore comprises, according to the case, the first portion 53 with a single conical edge (FIG. 2a) or with the development of a truncated pyramid (FIGS. 2b, 2c). The second portion 54 can instead have a rectilinear development (FIGS. 2a, 2b), a parabolic development (FIG. 2c), or a conical development similar to that described for the first portion 53.

It is advantageous to provide that the male mold 11, at least for the portions which have a desired conicity, progressively narrows from one end to the other with an angle of conicity $\beta$ greater than 5°, preferably between 5° and 20°, even more preferably between 10° and 15°.

This angle of conicity $\beta$, as well as allowing the easy extraction of the arm 10 from the mold 11, is suitably determined to optimize the resistance of the arm to the mechanical stresses to which it is subjected during use.

In the molding method, a layer of non-stick material 13 is initially deposited in the form of a spray on the external surface 17 of the male mold 11. Then the mandrel 12 is made to rotate so as to give the mold 11 a rotary movement around its longitudinal axis X. As it rotates, the male mold 11 draws from a distributor 14 a band of fibers of composite material 16 connected with one of its ends to the male mold 11.

The band of composite material 16 is composed of fibrous material pre-impregnated with a resinous matrix. The composite material 16 may also consist of simple fibers which are impregnated with the resinous material after they have been deposited on the male mold 11.

If pre-impregnated materials are used, the product is treated in autoclave before proceeding to extract it.

If, on the other hand, dry material is used, an infusion step is provided to infuse the resin into the deposited material, to which a treatment in autoclave may or may not follow. This method of introducing resin may not be provided if the process does not require it.

At the same time as the rotation of the core 11, the distributor 14 moves in a direction parallel to the axis X, with alternate movement along the length of the male mold 11.

The composition of the motion of the male mold 11 and the motion of the distributor 14 causes the band of composite material 16 to wind onto the external surface 17 of the male mold 11, following a helical path, so that the longitudinal axis X of the band of composite material 16, which also identifies the main orientation of the fibers of fibrous material, is inclined by an angle $\alpha$ with respect to the axis X of the male mold 11 (FIG. 1).

The mode of movement of the distributor 14, the density of deposition of the fibers along the longitudinal extension and the orientation of deposition of the fibers can vary depending on the zone of the arm 11. Specifically, these parameters vary depending on the types of loads which each zone of the arm 10 has to support. To this end, the zones affected by the pivoting elements, or articular elements, such as brackets or the ends of the actuators, must have the maximum isotropicity of fibers so as to resist multi-directional stresses. In these zones, the loads and therefore the stresses to which the arm 10 is subjected during use, change direction during functioning.

For example, with reference to FIGS. 2a, 2b, 2c, it can be provided that the ends of the first segment 50 and those of the second segment 51 have an isotropic distribution of the fibers, while the more internal parts of the first segment 50 and of the second segment 51 have mono-directional distribution of the fibers.

This is justified by the fact that pivoting elements are usually associated in proximity to the end of the arm 10 and therefore an intensification of stresses is foreseen. On the other hand, the central parts have a distribution of stresses which is generally uniform and mono-directional during use.

In fact it can be provided that the end portions of the first 50 and the second 51 segments have a distribution of fibers disposed in overlapping layers with variable orientations of the angle $\alpha$, for example In the order of 0°, 30°, 45°, 90°, 45°, 30°, 0° for the different layers which are deposited.

On the contrary, the central portions can have a distribution of fibers substantially parallel to the axis of the arm 10, and therefore the inclination of the angle $\alpha$ is about 0°. Moreover, in order to guarantee, for example, the absorption of possible torsion loads, these central portions can also have some layers disposed transverse to the longitudinal extension; for example it is possible to provide a disposition of the fibers angled 0°, 45°, 45°, 0° for the different layers which are deposited.

Moreover, in other forms of embodiment, a different distribution of the thicknesses of deposition along the longitudinal extension can be provided, for example it may be provided that, for zones of the arm 10 having smaller sizes of the section, it is necessary to apply a bigger quantity of fibers. It is also possible to provide (FIG. 2b), for example, that the end section of the first segment 50 has a thickness S which is half the thickness of the end section of the second segment 51.

Once the composite material 16 has been deposited in said manner, creating a desired thickness on the male mold 11, both the male mold 11 and the distributor 14 stop.

In a subsequent step, the composite material 16, deposited on the male mold 11, is subjected to a heat treatment, for example in autoclave, or similar, to consolidate its mechanical characteristics, in a manner known to the person of skill in the art. The layer of composite material 16 which surrounds the male mold 11 is then ejected from it to constitute the structure of the arm 10 in composite material.

The ejection of the composite material 16 from the male mold 11 is made possible and easy by the fact that the male mold 11 has a cross section which reduces, eventually alternating segments in which it remains constant, from one end to the other of the male mold 11, preferentially on both sides of the section.

In a fourth step, the arm in composite material 10 is subjected to known mechanical workings in order to eliminate the excess material and to create the connection seatings with other arms in composite material 10 or with possible auxiliary equipment.

According to the form of embodiment shown in FIGS. 3 and 4, a method to make arms in composite material 10 comprises a first step (FIG. 3) in which a plurality of sheets of fiber 25 are laid, in one or more layers, on a male mold or core 11 until they form a thickness at least equal to that of the walls of the arm in composite material 10 which is being made. The sheets of fiber 25 may be laid automatically in any way known to a person of skill in the art.

In a second step (FIG. 4), the male mold 11, wrapped in the sheets of fiber 25, is inserted into a casing 26 equipped with one or more inlet channels 27 and one or more outlet channels 28. The inlet 27 and outlet 28 channels are positioned so as to intercept, in one or more points, the thickness created by the group of sheets 25 deposited on the male mold 11. In the second step a resinous matrix in a liquid form is also injected into the volume between the male mold 11 and the casing 26, by means of the inlet channels 27. The resinous matrix passes through the thickness of the sheets of fiber 25, which are thus impregnated by it, then it exits from the casing 26 by means of the outlet channels 28. Once the resin has impregnated all the sheets of fiber 25 disposed on the core 11, creating a thickness of composite material 16, a possible third step may follow in which the composite material 16 deposited on the male mold 11 is subjected to heat treatment in a known manner, in autoclave for example.

With reference to FIG. 4a, it can be provided that the casing 26 has a plurality of inlet channels 27 disposed in correspondence to the section of the arm 10.

The inlet channels 27 are therefore disposed each in correspondence to one of the walls 31, 32, 33 of the arm 10.

The inlet channels 27 are sized to introduce a quantity of resin such as to homogeneously cover an area of about 90,000÷250,000 mm².

To this purpose, a distribution of the inlet channels 27 along the longitudinal extension of the casing 26 is provided, with a pitch P (FIG. 4) comprised between 300 mm and 500 mm.

In the case of arms 10 with large section sizes, it is possible to provide an increase in the number of inlet channels for each of the walls 31, 32, 33. For example (FIG. 4b), it can be provided that the casing 26 comprises two inlet channels 27 for each of the walls 31, 32, 33 of the arm 10, which are reciprocally distanced with respect to each other by a distance D comprised between 300 mm and 500 mm.

Subsequently, in a third step, the composite material 16 still deposited on the male mold 11, is ejected and extracted from it and constitutes the structure of the arm in composite material 10.

Also in this second type of method the deposition of the sheets of fiber 25 of the first step is facilitated by the at least partial planarity of the external surfaces 17 of the male mold 11. Moreover, the ejection of the composite material 10 from the mold is made possible by the fact that the male mold 11 has a cross section which reduces from one end of the other of the mold 11, here too, preferentially on both sides of the section.

In this case too, there is a last step in which the arm in composite material 10 is subjected to mechanical workings to complete and finish it, in order to eliminate excess material for example and to create the connection seatings with other arms in composite material 10 and with possible equipment.

Figure 5:
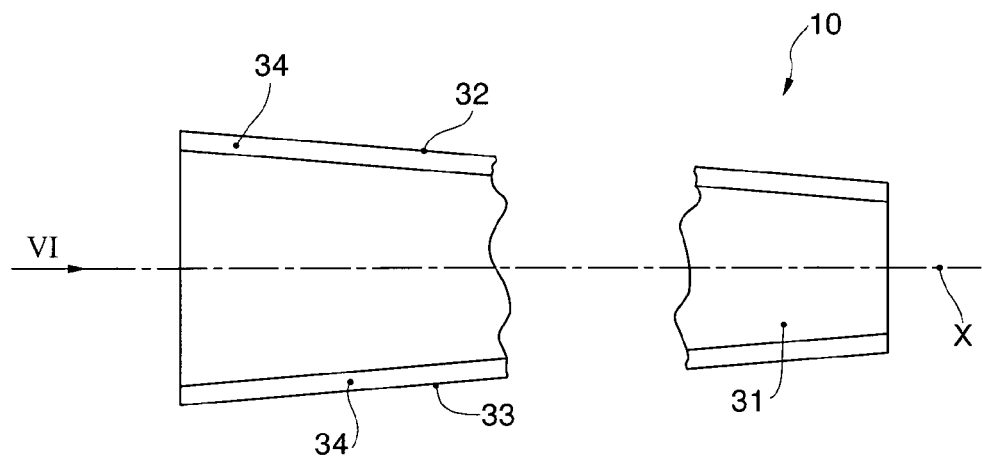
FIG. 5 is a longitudinal section of one form of embodiment of the arm according to the present invention.
Figure 6:
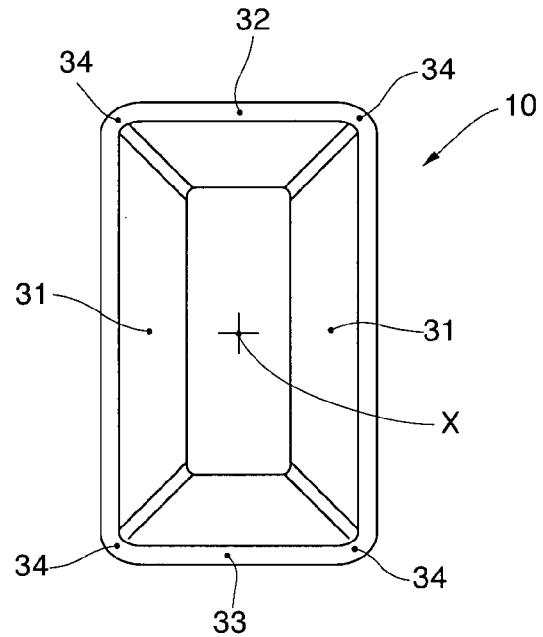
FIG. 6 is a cross section of the arm in FIG. 5.

With reference to FIGS. 5 and 6, an arm in composite material 10 made according to the present invention is substantially a beam with a hollow structure, in this case with a rectangular section.

The section of the arm in composite 10 reduces progressively, in this case, along the length of the arm 10.

The long lateral walls 31 of the arm 10 are substantially perpendicular with respect to the short upper wall 32 and lower wall 33, and all the walls are substantially flat, which facilitates the attachment to them of flanges, plates or other attachment components of elements functional to the attachment of accessory devices and/or the reciprocal attachment of two arms. The edges 34 between two walls are advantageously rounded. In a preferred solution of the invention, the rounded angle is comprised between 20 mm and 40 mm.

It is clear that modifications and/or additions of parts may be made to the method to make arms in composite material as described heretofore, without departing from the field and scope of the present invention.

The invention claimed is:

1. Method to make an arm in a composite material for articulated or telescopic modular structures for the distribution of concrete, the method comprising:
    providing a male-type mold having a cross section with at least a substantially flat wall, which reduces in at least one of its sizes and for at least a longitudinal portion, passing from one of its ends to the other,
    in a first depositing step, distributing one or more layers of fiber on an external surface of said male-type mold to form the arm, said fibers optionally pre-impregnated with a resinous matrix, and
    in a second extraction step, ejecting the male-type mold from the arm formed in the first depositing step,
    optionally providing heat treatment before ejecting the arm in the second extraction step,
    wherein, during said first depositing step, a distribution of said fibers is provided with a variable density along the longitudinal portion of said male-type mold, and
    wherein, during said first depositing step, a smaller density of fibers is deposited on a section of the male-type mold having a larger cross-sectional size and a larger density of fibers is deposited on another section of the male-type mold having a smaller cross-sectional size,
    wherein, during said first step, said fibers are deposited on a first portion of said male-type mold to define at least a first segment of said arm having a conical development with an angle of conicity ($\beta$) between 10° and 15°.

2. Method as in claim 1, wherein, during said first step, said fibers are distributed on a second portion of said male-type mold to define at least a second segment of said arm having at least one of its walls of the cross section with a profile with a parabolic development.

3. Method as in claim 1, wherein said first segment extends for about 20% of the overall length of said arm and a second segment extends for the remaining part.

4. Method as in claim 1, wherein, said cross section of said male-type mold progressively reduces in size, in a continuous manner, for said at least a longitudinal portion and, during said first depositing step, said variable density progressively increases, in a continuous manner, for said at least a longitudinal portion in inverse relation to said cross section size.

5. Method as in claim 1, wherein, in correspondence to the section of the male-type mold with the smaller cross-sectional size, a layer of fibers is deposited with a thickness substantially double a thickness deposited in correspondence to the section of the male-type mold with the larger cross-sectional size.

6. Method as in claim 1, wherein, during said first depositing step, several overlapping layers of said fibers are deposited, each of said layers having the fibers deposited according to different orientations relative to at least one other layer.

7. Method as in claim 1, wherein the cross section of said male-type mold is polygonal, rectangular or square, wherein all the faces of which it consists are substantially flat.

8. Method as in claim 1, wherein said cross section of said male-type mold is polygonal and an edge disposed at the intersection between two consecutive sides of the cross section is rounded.

9. Method as in claim 1, wherein the technique for depositing the fibers is one of RTM (Resin Transfer Molding), pultrusion and filament winding.

10. Method as in claim 1, wherein an intermediate step is provided between said first and said second step, in which said male-type mold on which said fibers are wound is inserted in a casing and a resinous matrix is introduced using channels made in said casing in order to impregnate said fibers.

\* \* \* \* \*